United States Patent [19]
Baker et al.

[11] 4,178,952
[45] Dec. 18, 1979

[54] INERTIAL VALVE

[76] Inventors: William J. Baker, 1469 Belview, Apt. 702, Burlingame, Calif. 94010; Gerry L. Baker, 34 Alviso Ct., Pacifica, Calif. 94044

[21] Appl. No.: 843,881

[22] Filed: Oct. 20, 1977

[51] Int. Cl.² .............................................. F16K 17/36
[52] U.S. Cl. ........................................................ 137/38
[58] Field of Search .................................. 137/38, 39

[56] References Cited
U.S. PATENT DOCUMENTS

| | | | |
|---|---|---|---|
| 2,812,770 | 11/1957 | Sullivan | 137/39 |
| 3,965,917 | 6/1976 | Speck | 137/38 |

*Primary Examiner*—Robert G. Nilson
*Attorney, Agent, or Firm*—Henry G. Kohlmann

[57] ABSTRACT

An inertial trip valve actuated by vibration to close gas lines and the like in the event of earthquake for safety. Said valve is provided with an external reset. Said reset cannot be used to defeat the operation of the device by tying the reset handle because the reset action momentarily closes the valve. The valve comprises an inlet flapper valve and an outlet shear valve. Said flapper valve is closed under a spring load when an inertial trigger is tripped. Said flapper valve may be reset by an external handle which closes a shear valve during the reset operation thus preventing the defeat of the trigger operation.

9 Claims, 4 Drawing Figures

INERTIAL VALVE

BACKGROUND OF THE INVENTION

1. Field of the Invention

The field of this invention relates to valves adapted for closing upon vibration. More specifically, this invention relates to inertial valves which close on vibration caused by earthquakes and terminate the flow of gas and the like thus preventing explosion caused by broken pipes.

2. Description of the Prior Art

Many valve are taught in the prior art and are typified by U.S. Pat. No. 3,406,700 to BEAZER. However, the inertial valves existing in the prior art are essentially a ball type device which rests on a shelf and falls into the valve seat upon vibration.

The ball type inertial valves do not lend themselves to easy reset. Spring loaded valves do reset easily, however, the handle used to reset the valve can also be used to defeat its purpose by tying the reset open.

Accordingly, it is an object of this invention to provide an inertial valve that can be tripped by vibration and then easily reset.

It is a further object of this invention to provide a resetable inertial valve the operation of which cannot be defeated by the tying down the reset handle or by other external means.

SUMMARY OF THE INVENTION

The invention is an inertial valve having a trigger which is tripped when the valve vibrates by a weight that resists motion due to its inertia and releases a spring loaded valve. The spring valve is easily reset by an external handle which opens the spring valve and simultaneously closes a shear valve. Thus, the device cannot be bypassed by tying down the reset handle because the valve will remain closed. This also allows the user to manually shut the valve by simply placing the handle in the off position without regard to the spring valve.

Reset is accomplished when the handle causes the valve to open beyond the trigger which is held in place by springs and thus holds the flapper in position until vibration again trips the trigger.

DESCRIPTION OF THE PREFERRED EMBODIMENT

Figure 1:
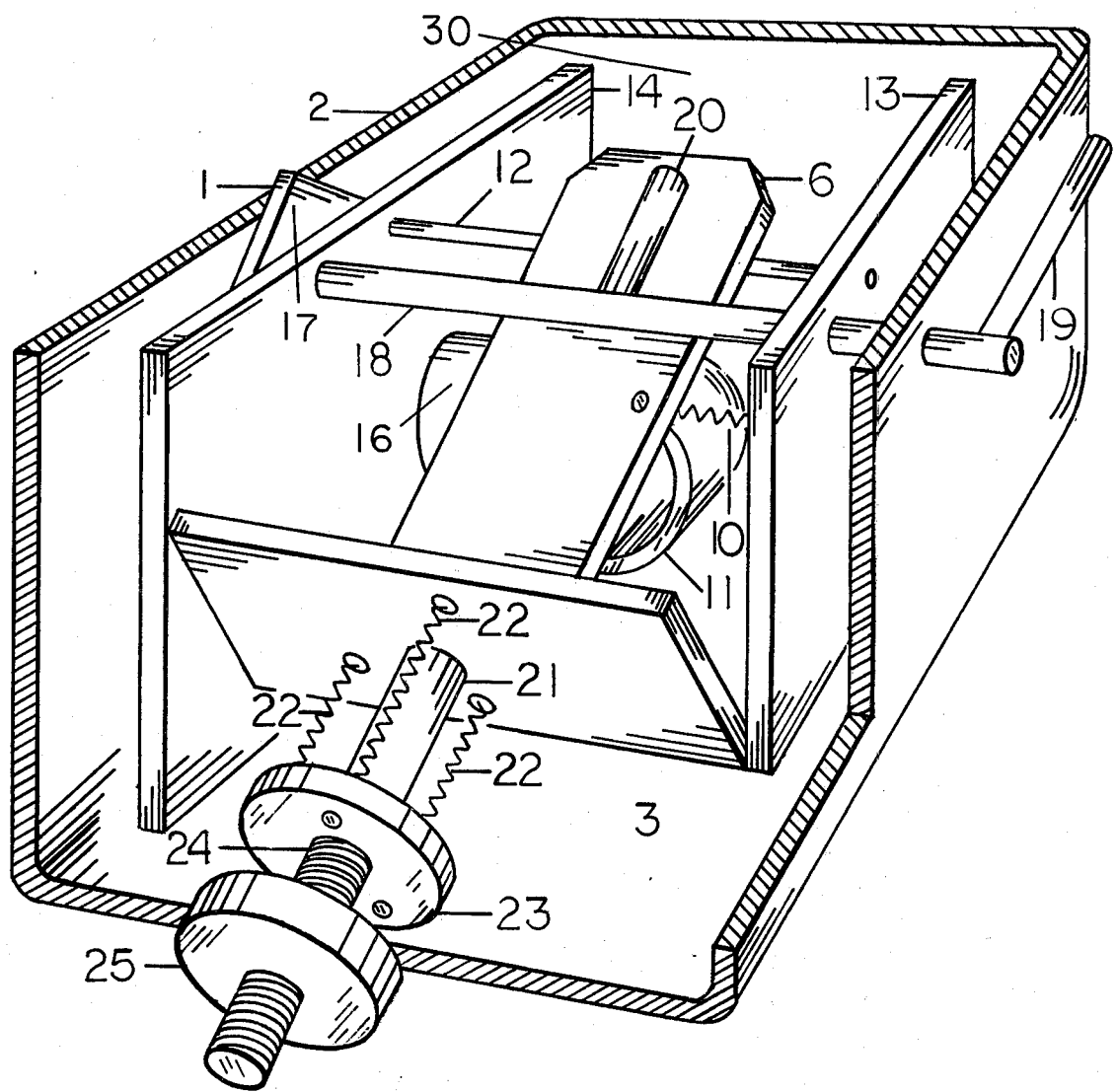
FIG. 1 is a sectional view of the valve housing and interior mechanism.
Figure 2:
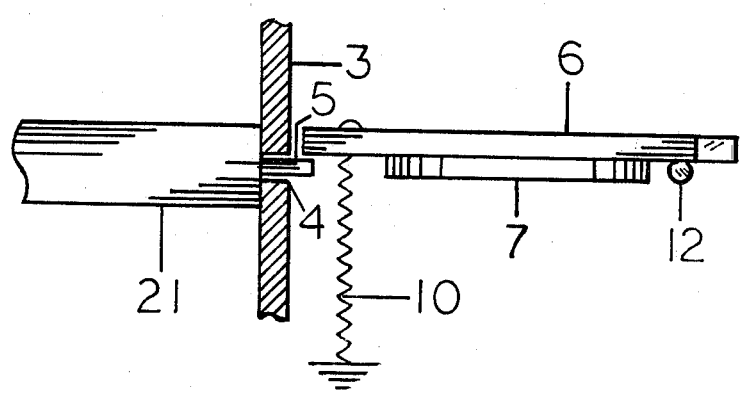
FIG. 2 is a detailed side view of the falpper valve.

With reference to the figures, FIG. 1 shows a valve 1 comprising a housing and an inner framework comprising a plate 3 having a hole 4 central thereof for loosely receiving a pin 5. Said pin 5 is substantially smaller in diameter than said hole 4 which allows said pin to assume an oblique position in said hole 4. The pin 5 protrudes slightly beyond the surface of plate 3 and engages a flapper valve 6 biased against said pin 5 by a spring 10. When said pin 5 assumes an oblique position within said hole 4 is does not protrude sufficiently to continue to engage said flapper valve 6 and said spring 10 causes the valve 6 to snap closed on a seat 11 and prevent the flow of gas and the like through the valve 1.

Figure 3:
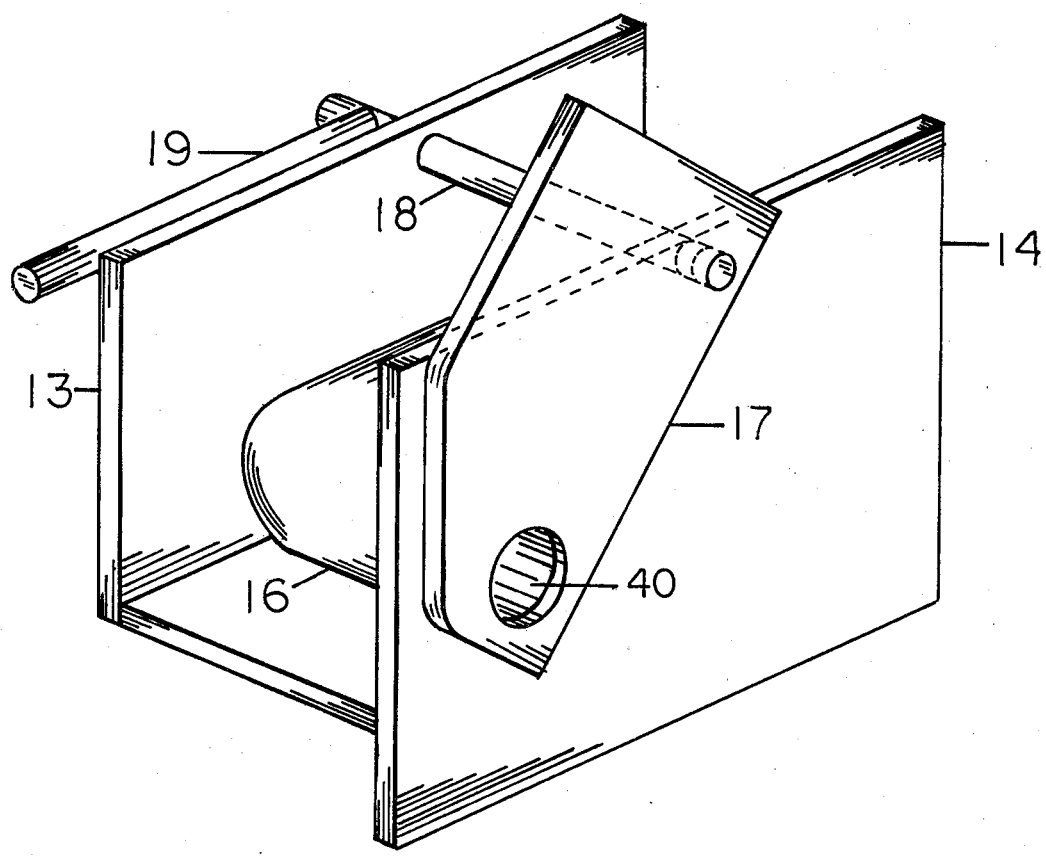
FIG. 3 is a view of the shear valve.

The high pressure side of the valve is within the housing 2 forming an input chamber 30 and causes flapper valve 6 to remain closed until reset manually. Valve 6 may be provided with a resilient seating pad 7 which engages the seat 11 for a proper seal. Said flapper valve 6 is rotatably attached by a rod 12 near the top thereof to plates 13 and 14. Plate 14 receives a hollow tubular member 16 which is in the shape of a conventional ell and communicates through said plate 14. Said member 16 supports seat 11 at the end opposite the point of attachment to plate 14. Between plate 14 and the housing 2 is a shear valve 17 operated by a control rod 18 rotatably attached to said plate 13, 14 and housing 2. FIG. 3 illustrates the shear valve 17 in the open position registered with the hollow tubular member 16 which forms an output chamber 40. Valve 17 must be rotated counter clockwise as seen in FIG. 3 to effect closure such that valve 17 covers the opening in member 16 as is required when resetting valve 6 as described above. A handle 19 is attached to the portion of control rod 18 which protrudes out of housing 2 such that an operator may actuate said shear valve 17 externally of said valve 1. Control rod 18 is allowed to rotate with respect to said housing 2 but is pressure sealed such that no leakage through the housing around said rod 18 can occur. This can be accomplished by brass bushing inserts or any other conventional sealing means. Shear valve 17 seats into brass seats in both plate 14 and housing 2 or other conventional shear valve seats.

Control rod 18 is provided with a tab 20 which engages the top of flapper valve 6 above rod 12 when the shear valve 17 is closed. When the tab 20 engages said flapper valve 6, the valve 6 is rotated about rod 12 until pin 5 is contacted. Additional rotation will cause the pin 5 to assume an oblique position in hole 4 thus allowing valve 6 to pass said pin 5. When the valve 6 base clears pin 5, said pin 5 assumes a position parallel to the longitudinal axis of hole 4 and prevents valve 6 from closing until pin 5 again assumes an oblique position which releases said valve 6.

Pin 5 is supported by an elongated rod 21. Rod 21 is of substantially greater diameter than hole 4 and supports said pin 5 centrally thereof at one end. Said end is flat and biased against plate 3 by a plurality of springs 22. Said springs 22 are adjustably attached to said rod by a collar 23. Said collar 23 is a circular disc screwably attached to threads 24 along the length of the rod opposite pin 5. Springs 22 are spaced uniformly about said collar 23 and fixedly attached thereto at one end. The opposite end of said springs 22 are fixedly attached to plate 3. Said collar 23 may be adjusted longitudinally of said rod 21 thereby increasing the tension of springs 22.

A weight 25 is also screwably attached to said rod 21 and may be adjusted longitudinally thereof. Therefore when said valve is vibrated by any means such as during earthquakes and the like the inertia of the weight causes the pin 5 to assume an oblique position and allow the valve to close thus, preventing dangerous explosions due to broken gas lines and the like.

Proper adjustment of the position of weight 25 and collar 23 will allow selected levels of vibration to actuate the valve. The greater the bias the greater the vibration required to trip the valve 1. Handle 19 may of course be used to reset the valve as described before. If an attempt is made to defeat the operation by tying the handle 19, the shear valve presents flow of gas and the like while at the same time allowing manual closure of the valve external of the device.

Figure 4:
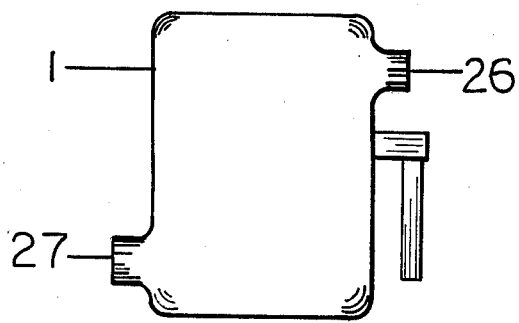
FIG. 4 is a view of the housing for the valve showing inlet and outlet.

FIG. 4 shows the enclosed nature of the valve 1, having an inlet or input 26 which communicates with the interior of the housing 2 and an outlet or output 27 which communicates with said output chamber 40.

The foregoing is considered illustrative only of the principles and specific embodiment of the invention. Further, since numerous modifications and changes will readily occur to those skilled in the art, it is not intended to limit the invention to strictly that described herein but such is to include all modifications and equivalents falling within the scope of the invention herein claimed.

What is claimed is:

1. A safety inertial valve system which comprises:
   a. a housing;
   b. at least one first valve contained within said housing,
   c. means for closing said first valve in response to vibration;
   d. means for opening said first valve;
   e. at least one second valve contained within said housing; and
   f. means for opening and closing said second valve coupled to said first valve opening means said means for opening said first valve and said means for opening and closing said second valve causing said second valve to be closed while opening said first valve.

2. A valve system as described in claim 1 further comprising:
   at least one chamber separating said valves.

3. A valve system as described in claim 2 further comprising:
   a. an input to said valve system; and
   b. an output from said valve system.

4. A valve system as described in claim 3 wherein:
   a. an input chamber separates said input from said first valve;
   b. an output chamber separates said first valve from said second valve; and
   c. said second valve separates said output chamber from said output.

5. A valve system as described in claim 4 wherein said means for closing said first valve comprises:
   a. a trigger for engaging and releasably holding said first valve open,
   b. spring means biasing said first valve against the trigger and towards the valve seat, and
   c. a weight attached to said trigger for activating the same in response to vibration, whereby the inertia of said weight moves said trigger relative to the valve system during vibration thereof and releases the first valve which closes against the seat under the bias of said spring means.

6. A valve system as described in claim 5 wherein said weight is adjustable of said trigger and may be adjusted to move said trigger at selected degrees of vibration.

7. A valve system as described in claim 6 wherein said means for opening said first valve comprises:
   a. a handle external of said housing; and
   b. a rotatable shaft attached to said handle which releasably engages said first valve and causes the same to open and engage said trigger when said handle is rotated, whereby said handle may be rotated until said first valve engages said trigger thereby resetting the valve system.

8. A valve system as described in claim 7 wherein:
   said rotatable shaft also engages said second valve and rotation of said handle to open said first valve closes said second valve, whereby, when said first valve is opened said second valve is closed and when said first valve engages said trigger said handle may be rotated in an opposite direction to open said second valve.

9. An inertial valve system comprising:
   a. a housing;
   b. an intake port in said housing;
   c. an intake chamber adjacent said intake port;
   d. an output port in said housing;
   e. an output chamber adjacent said output port;
   f. a first valve separating said intake chamber and said output chamber;
   g. a trigger mechanism actuated by vibration which closes said first valve;
   h. a second valve separating said output chamber and said output port;
   i. means for opening said first valve and resetting said trigger after closing said second valve; and
   j. means for opening said second valve; whereby the closing of said first valve in response to vibration cannot be defeated.

* * * * *